W. V. HADLEY.
ENDLESS TRAVELING CUTTER.
APPLICATION FILED AUG. 14, 1907.
929,087.
Patented July 27, 1909.
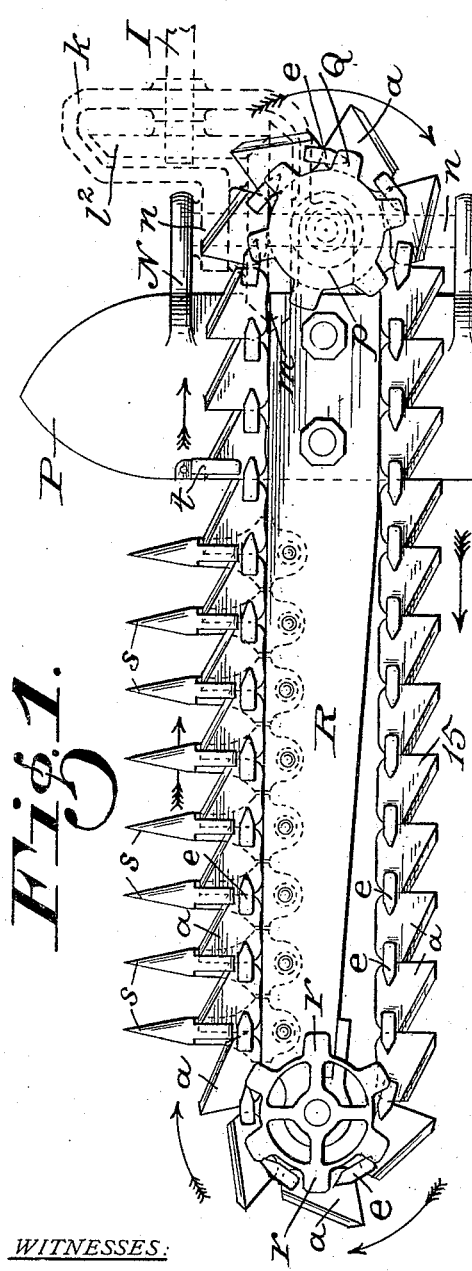
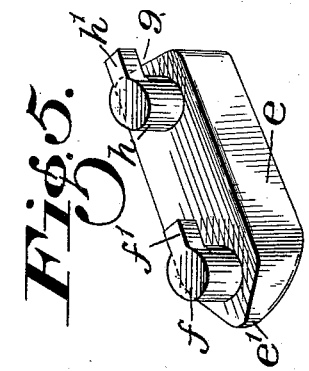
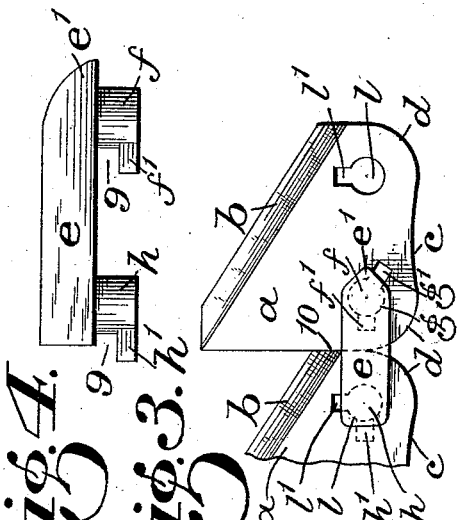
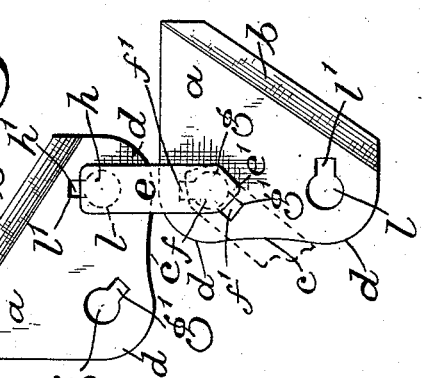
WITNESSES:
Jas. O. Hartshorn.
Elanora C. Hadley.
INVENTOR.
Warren V. Hadley,
BY Frank M. Burnham
ATTORNEY.

UNITED STATES PATENT OFFICE.

WARREN V. HADLEY, OF DAYTON, OHIO.

ENDLESS TRAVELING CUTTER.

No. 929,087.  Specification of Letters Patent.  Patented July 27, 1909.

Application filed August 14, 1907. Serial No. 388,471.

*To all whom it may concern:*

Be it known that I, WARREN V. HADLEY, a citizen of the United States, residing at Dayton, in the county of Montgomery and State of Ohio, have invented certain new and useful Improvements in Endless Traveling Cutters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention relates to endless traveling cutters, and while originally intended and designed more particularly for harvesting machinery;—for which form of application the invention is herein set forth;—is also susceptible in its application and use, in combination with suitable actuating means; of being employed to equal advantage on lawn-mowers and various other classes of devices and for other purposes, for which the same may be applicable.

The objects or purposes, and advantages of this invention consist primarily, in producing a cutting device or providing a cutting means for harvesting machinery, that will cut or sever the grain more readily, and give more perfect results generally, than the old form of sickles or long knives now in use, by so constructing my said knives or cutters as to allow or permit of the same being revolved or given a rotary or circular motion; thus doing away with the objectionable pitman and gearing for same, so common to the knives or cutters of all harvesting machinery, and the objectionable reciprocating motion thus imparted, which produces a jerking, irregular movement, thereby causing a loud, harsh, rattling and rasping noise, and creating a great strain and wear and tear upon the parts, requiring constant attention and necessitating frequent repairs.

My rotary or endless cutting chains require very little power, time, labor, and attention or repair: when placed on harvesting machines or lawn mowers, they lower the cost of manufacture, by doing away with " cutter-bars " and " pitmen ".

The cutting links making up my rotary knives or endless cutting chains, may be quickly disconnected or detached when removing the chain, or readily joined or connected when placing the chain together.

Referring to the annexed illustrations constituting a formal part of this specification and wherein the same letters and numerals of reference are employed to indicate or point out the same parts wherever occurring throughout the several views:—Figure 1, is a general view showing an endless cutting chain or series of my rotary knives or cutting links in operative position, as applied to a mover, and sufficient of the actuating mechanism to illustrate one form of application of my invention. Fig. 2, is a plan view of two of the sectional knives or cutting links,—composing the endless cutting chain or cutters,—and the connecting or locking-link; in the position they assume when being joined: and Fig. 3, is a plan view—partially broken away,—of the parts as shown in Fig. 2, but in the position they assume when joined or connected in forming the endless cutting chain; and Figs. 4, 5 and 6 show respectively; side, perspective and plan views of the connecting or locking-bar.

In describing in detail the various mechanical parts of my device which constitute my invention, as set forth in the drawing $a$ refers to the knife-sections or cutting-links, each of which is provided with an inclined cutting edge $b$, and is slightly concaved at $c$—for the purpose of facilitating their passage or travel around the grooved rim or periphery of a sheave or sheave-sprocket wheel,—while the corners are rounded at $d$ as shown, so as to allow said cutting-links being brought together when making up the chain; also to permit them to travel around a curved surface without binding,—and as fully and clearly shown in Fig. 2, in which the connecting or locking link $e$ as shown in dotted lines broken away, has first had its forward key or foot $f$ and catch or toe $f^1$ inserted in rear opening $g$ and recess $g^1$—(of one of the knife-sections or cutting-links which make up the endless cutting-chain as shown in Fig. 1);—when said connecting or locking-link is turned until rear key or foot $h$ and catch $h^1$, are next inserted through the forward opening $l$ and recess $l^1$; when by reason of said cutting-links being approximately the thickness of the space between each catch $f^1$ and $h^1$, and the body of locking-link $e$, as shown at 9 in Figs. 4 and 5; will allow of the parts to be moved until they assume the position shown in Fig. 3, when the links being each sufficiently thick, the forward edge of one link will bear firmly against the rear edge of the link just in front of it, as indicated at 10; while said catches of connecting or locking-link e in conjunction with the body of same, will hold or lock said links in position as against any displacement, thus holding said edges of said links at 10 in alinement one with the other as fully shown in Figs. 1 and 3. It will here be observed that for the purpose of facilitating the travel of connecting-link e over the grain or grass as cut, and so it will be impossible to thus obstruct, hinder or delay the passage or travel of said cutting links through said grain or grass as cut, I have pointed and rounded at $e^1$ the forward end of each of said connecting-links.

In Fig. 1, I have shown the preferred form or style of my rotary sectional knives or endless cutting chain, as arranged for application to a mowing machine, although the invention may be utilized for various other purposes and applied to various other devices, and it is obvious and will become quite apparent that my endless cutting chain may be operated by many and various other forms of actuating mechanism. I have however here shown—partially in dotted lines and omitting the teeth of the gears for clearness;—one style of actuating mechanism, in which I, indicates the main shaft which is shown as broken away, but which in practice connects with a sprocket and chain—or any other suitable means by which the power is transmitted to said shaft located in any suitable supporting frame $k$,—upon which is mounted a bevel gear wheel $l^2$ in mesh with double bevel gear wheel $m$, mounted on shaft $n$ having a hinged support in bearing arms N projecting from an ordinary shoe P: said double bevel gear wheel in turn in mesh with bevel gear wheel $p$ rigidly mounted upon the shaft of main sheave sprocket wheel Q, by which motion is transmitted to, and drives said sheave-sprocket wheel around, which carries and passes my endless cutting-chain 15, thus driving said chain in the direction indicated by the arrows, and around sheave sprocket wheel $r$ supported by finger bar R;—which latter is in turn connected by bolts to shoe P. Finger-guards $s$ project from said finger-bar in the usual manner, and also a small guard $t$ which is connected to the inner face of the shoe; through the slot of each of which said endless cutting chain passes as it revolves or rotates around sheave sprocket wheels Q and $r$ in doing the cutting; said finger-guards and small guard acting as guides for said endless cutting chain.

It will of course be understood that all parts of my device are intended to be constructed out of metal, and that the irregular openings $l$ and $g$ are of the exact shape or contour,—only slightly larger—than the keys $f$ and $h$ formed with the catches $f^1$ and $h^1$ which are one just like the other; thus allowing of said keys and their catches to readily pass through each opening and its recess; and that while said keys and catches are arranged on each of said locking-links in longitudinal alinement, said openings and recesses do not come in alinement, but are arranged as shown in Figs. 2 and 3.

Having now carefully illustrated, and clearly described my rotary knives or endless cutting-chains; what I claim as my invention is:—

1. The combination in an endless cutting-chain of the cutting links each having a knife edge and provided with recessed openings; and the connecting links each formed with a point and provided with keys, each of said keys being provided with a catch, each of said catches being adapted to be inserted in one of said recessed openings, thereby locking said cutting-links in a position continuous one with the other; all substantially in the manner and for the purposes described.

2. An endless cutting chain having cutting-links each of which is provided with a knife or cutting edge, and formed with rounded corners and a concaved portion, and further formed with openings each being semi-circular and having a straight recess therein, the recess of one coming at an angle to the recess of the other opening; all substantially as described.

3. In an endless cutting-chain, a locking-link for connecting and holding the cutting-links of said chain together, said locking-link being rounded to a point at one end and provided with keys, each of which is formed with a toe or catch; substantially as shown and described.

In testimony whereof, I affix my signature, in presence of two witnesses.

WARREN V. HADLEY.

Witnesses:
T. J. PERRIN,
ELANORA C. HADLEY.